UNITED STATES PATENT OFFICE.

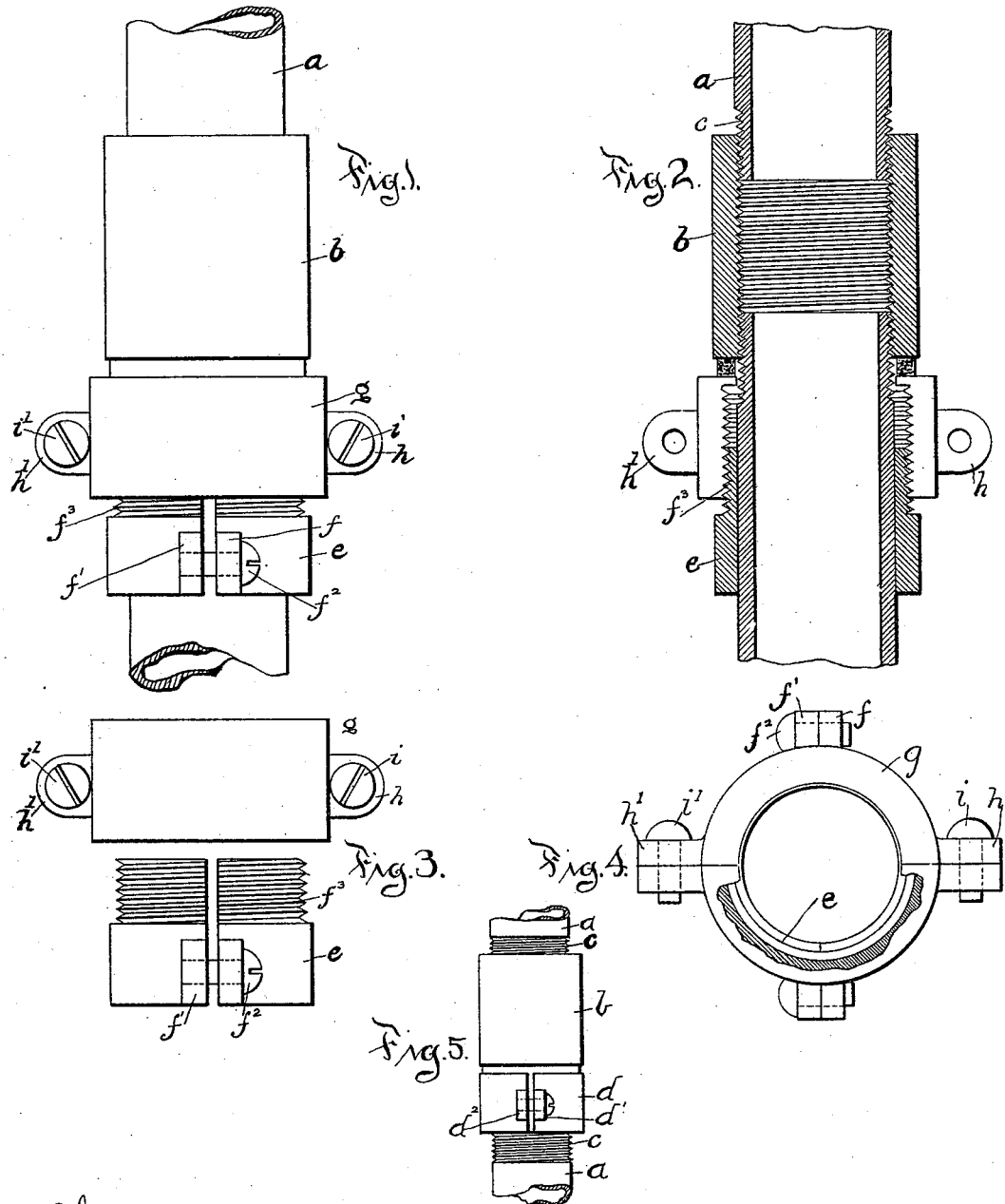

WILLIAM VANDERMAN, OF WILLIMANTIC, CONNECTICUT.

PIPE-JOINT REPAIRER.

SPECIFICATION forming part of Letters Patent No. 580,996, dated April 20, 1897.

Application filed December 17, 1895. Serial No. 572,419. (No model.)

*To all whom it may concern:*

Be it known that I, WILLIAM VANDERMAN, a citizen of the United States, and a resident of Willimantic, in the county of Windham and State of Connecticut, have invented certain new and useful Improvements in Pipe-Joint Repairers, of which the following is a full, clear, and exact description, whereby any one skilled in the art can make and use the same.

The object of my invention is to provide means for repairing a leak at the joint in the pipe of a steam-heating or water-heating apparatus or in any line of pipe for whatever purpose it may be used. It frequently happens that in the piping of a hot-water heating apparatus a leak will start at or near a joint and particularly near a coupling or union, and in order to stop such a leak it has been necessary to shut down the apparatus, drain it of its contents, and cut out the defective part, and this often causes leaks in other connected parts of the pipe, owing to the strains put upon it in uncoupling and in removing the sections. My within-described improvement enables such leaks to be repaired without removing any portion of the piping; and to this end my invention consists in the details of the several parts making up the repair device, and in the combination of such parts with the piping, as more particularly hereinafter described, and pointed out in the claims.

Referring to the drawings, Figure 1 is a view in elevation of a length of piping which may form part of a heating apparatus united by a coupling and showing my repair device in place. Fig. 2 is a detail view in section of the parts as shown in Fig. 1, illustrating the construction. Fig. 3 is a detail view in elevation of the separated parts of the repair device. Fig. 4 is a detail top or plan view of the repair device, showing construction. Fig. 5 is a view showing the sectional nut used as a means for clamping the packing about the joint.

In the accompanying drawings the letter $a$ denotes a line of piping made in sections and united by a coupling $b$ at the joint in the pipe. The end of each of the sections of pipe is provided with a screw-thread $c$, fitting the thread in the coupling part, and this thread often extends a short distance along the pipe beyond the coupling.

My improved repair device consists in its simplest form of a sectional clamp $d$, (see Fig. 5 of the drawings,) made in two sections separated lengthwise on a diametrical line, the clamp as a whole being annular and provided near the joint on each section with lugs $d'\ d^2$, through which bolts or screws extend as a means of drawing the two sections firmly together. The inner surface of this clamp is screw-threaded and the opening through it is of a diameter adapted to fit snugly upon a pipe. When the thread on the pipe extends far enough beyond the joint to receive this sectional clamp, it is secured to the pipe at a short distance beyond the end of the coupling, its end forming a shoulder upon which a suitable gromet packing is wound about the pipe. By the rotation of the clamp the threads of which interengage threads on the pipe it is forced up into contact with the shoulder formed by the end of the coupling pressing the packing between these two parts and stopping the leak.

In the preferred form of my invention the clamp-section $e$ is formed in two equal parts, the lugs $f\ f'$ projecting near the plane of separation of the parts affording a support for the clamp-screws $f^2$, which extend through threaded sockets in the opposing lugs. This clamp-section has a threaded portion $f^3$, extending along the pipe beyond the lugs, and on this threaded portion a sectional nut $g$ is fitted, this nut having an interior thread fitting the thread on the clamp-section and being provided with lugs $h\ h'$, through which clamping-screws $i$ extend in a manner similar to that described with reference to the clamp-section.

The clamp-section is first secured in place on the pipe at a suitable distance below the end of the coupling to allow room for the nut and for the soft packing which is wound about the pipe between the shoulder on the nut and the shoulder formed by the end of the coupling. By rotating the nut the packing is firmly compressed between the shoulders on the respective parts and the leak effectively stopped. The shoulder on the end of the nut may be made of any suitable form to compress and hold the packing firmly in place. The surface may be at right angles to the surface of the pipe, or it may be undercut or otherwise located.

This improvement has been described with reference to a leak occurring at a coupling, but it is obviously equally applicable at any joint in the pipe whether formed by a coupling, a union, a T, or an elbow, the repair device being secured in place on the pipe in the manner already described.

In case the sectional nut alone is used, as above described, and the pipe is not threaded for a sufficient distance the nut may be made of a material sufficiently hard as to this thread to cut its own way after it is clamped upon the pipe, the thread so cut in the pipe being shallow but yet of sufficient depth to hold the clamp against any lengthwise movement on the pipe caused by any resistance which the soft packing may offer as the nut closes toward the shoulder in holding the packing in place.

I claim as my invention—

1. The improved repair device comprising a sectional clamp with an exterior threaded portion, means for securing the clamp-sections together, a sectional nut having a thread fitting the thread on the clamp-section, and means for securing the sections of the nut in place on the clamp, all substantially as described.

2. In combination with a pipe, a coupling, a sectional clamp secured in place on the pipe, a thread on the clamp-section, a sectional nut having a thread fitting the thread on the clamp-section, means for clamping the said nut to the clamp-section, and a packing interposed between the shoulder on the nut and the shoulder on the coupling, all substantially as described.

3. In combination with a pipe, a coupling, a sectional clamp secured in place on the pipe by clamp-nuts extending through ears in the respective clamp-sections, a thread on the clamp-section, and a sectional nut having a thread fitting the thread on the clamp-section and held in place by clamping-bolts extending through lugs on the opposing sections, and the packing interposed between the shoulder on the nut and the shoulder on the coupling, all substantially as described.

4. The improved repair device comprising a sectional clamp with an exterior threaded portion and having lugs with sockets for clamp-screws, the clamp-screws located in said sockets, and the sectional nut having a thread fitting the thread on the clamp-section and provided with lugs, and clamp-screws extending through the lugs whereby the parts of the section are held together, all substantially as described.

WILLIAM VANDERMAN.

Witnesses:
ARTHUR B. JENKINS,
J. STERN.